March 10, 1959     G. W. THOMAS     2,876,694
MARSHMALLOW AND HOT DOG ROASTING STICK
Filed Dec. 23, 1957
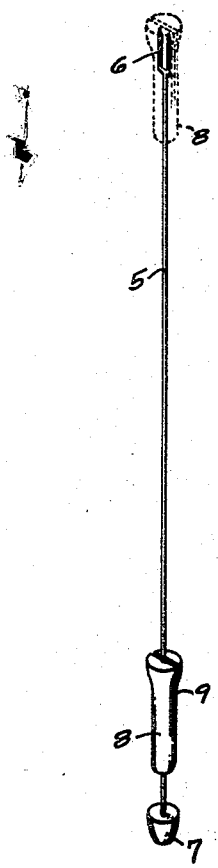
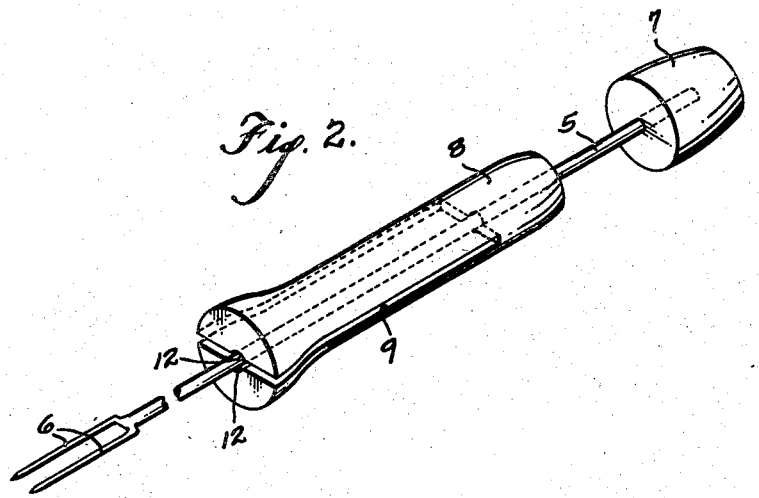
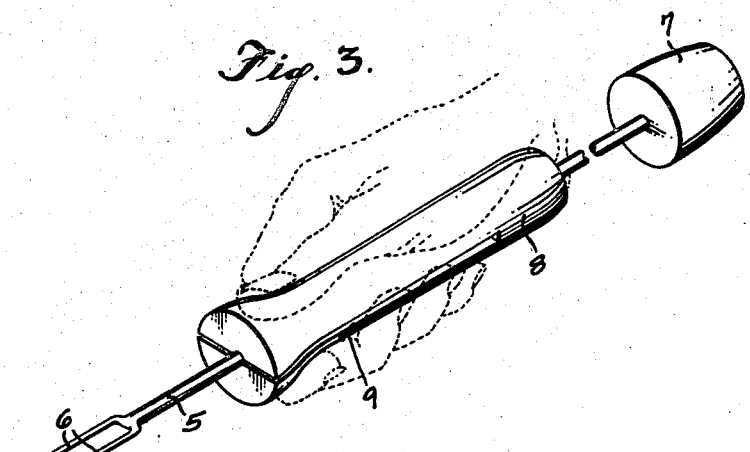
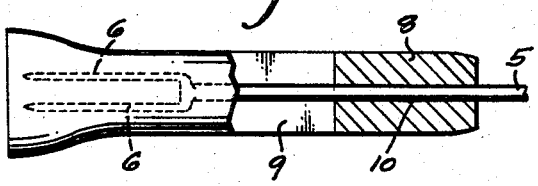
INVENTOR.
GEORGE W. THOMAS
ATTORNEYS

United States Patent Office 2,876,694
Patented Mar. 10, 1959

2,876,694

MARSHMALLOW AND HOT DOG ROASTING STICK

George W. Thomas, Seattle, Wash.

Application December 23, 1957, Serial No. 704,513

4 Claims. (Cl. 99—421)

This invention relates to roasting sticks, and especially a stick for use in roasting wieners, marshmallows, corn, and the like, being of that nature providing a lightweight rod of fairly considerable length presenting upon one of its ends a sharpened fork for piercing the concerned food article and upon the other end providing a means permitting the rod to be turned about its axis as roasting proceeds.

As one of its objects the invention aims to provide a device of the character described having mounted upon the rod a hand-grip adapted to be held by the user, and which said hand-grip is characterized in that the same is slidable along the length of the rod from a retracted position whereat the rod can be comfortably supported during a roasting operation into an advanced position proximal to the fork for stabilizing the forked end while applying a food article to or removing the same from the prongs.

The invention has the further and important object of so engineering said hand-grip that gripping pressure applied thereto will operate to seize the rod and hold the fork against liability of turning as the food article is applied to or removed from the prongs.

As an alternative procedure for holding the fork against turning motion relative to the hand-grip, employed in lieu of pinching said rod by compressive pressure applied to the hand-grip, the invention aims to so engineer the hand-grip that the same may be interlocked at will with the fork.

As a yet further object the invention aims to provide a roasting stick of the character described in which the prongs are wholly pocketed within the hand-grip when the hand-grip is advanced to the forward extreme of its sliding travel so that such hand-grip will then perform the function of a sheath and protect the prongs during periods when the roasting stick is not in use.

With the above objects and advantages in view and further purposing to provide a roasting stick which is of simple and inexpensive construction, one which is attractive in appearance, and which can be easily and efficiently used in the performance of its intended function, the invention consists in the novel construction and in the adaptation and combination of parts hereinafter described and claimed.

In the accompanying drawings:

Figure 1 is a view in perspective portraying a roasting stick constructed to embody the preferred teachings of the present invention, and showing the hand-grip both in full lines and in phantom to represent the positions occupied when said hand-grip is approximately fully retracted and fully advanced, respectively.

Fig. 2 is a fragmentary perspective view thereof drawn to an enlarged scale.

Fig. 3 is a fragmentary perspective view portraying the hand-grip in an advanced position and representing by phantom the fingers of a user's hand in the act of compressing the hand-grip so as to pinch the rod; and Fig. 4 is a fragmentary view partly in elevation and partly in section to illustrate the sheathing of the prongs within the hand-grip.

Referring to said drawing the rod of the present invention is designated by the numeral 5, being composed of metal and having welded or otherwise rigidly secured to its front end a fork whose prongs 6 are sharpened so that the same may readily penetrate a marshmallow, wiener or the like. The longitudinal median axis of said fork is co-axial to the rod. It is desirable that the prongs have a diameter less than that of the rod.

The rod carries separate handles for engagement by each of the two hands of the user. One of these handles occupies a localized position at the rear end of the rod and is fixed thereto so that turning motions given to the handle will turn the fork. Such handle is here shown as comprising a button 7 of wood, plastic or other suitable material into which the end of the rod is firmly embedded but it is self-evident that a crank or the like could be substituted for the button.

The other handle 8 is slidably mounted upon the rod and is by preference spindle-like in shape with a length sufficient to accommodate all the fingers of a user's hand and having the front end moderately flared to provide an augmented thumb purchase. Said sliding handle 8, or hand-grip as it will be hereinafter termed, has a diametrical slot 9 extending from the front end for a substantial portion of its length. The width of the slot approximates the diameter of the prongs 6, and by such token is less than the diameter of the rod. To accommodate such greater width of the rod the hand-grip's center-bore 10, through which the rod is slidably journaled, is prolonged along the upper and lower faces of the slot in the form of saddle grooves 12. Compression pressure of the hand upon the split fore section of the hand-grip pinches the rod between these saddle grooves to restrain the rod against turning motion within the hand grip. This is desirable when applying articles of food to or removing the same from the prongs, at which time the hand-grip is or may be slidably advanced into a position proximal to the prongs with a coincident freeing of the user's other hand from the basal handle 7. In lieu of pinching the hand-grip upon the rod, the same result, and namely that of restraining the rod against turning, may perforce be accomplished by lodging the heel end of the fork in the extreme end of the slot, leaving substantially the entire length of the prongs exposed. When the roasting stick is not in use, the hand-grip is advanced as indicated in Fig. 4 to a point whereat the prongs are completely recessed within the slot, providing a protective sheath for the sharp ends of the prongs.

The hand-grip 8, as with the handle 7, may be produced from wood, plastic or other suitable material, and either or both may be in a color contrasting from the corresponding part or parts of companion roasting sticks, thus distinguishing several sticks in a set one from another.

It is thought that the invention will have been clearly understood from the foregoing detailed description of my now preferred illustrated embodiment. Minor changes in the details of construction will suggest themselves and may be resorted to without departing from the spirit of the invention, wherefor it is my intention that no limitations be implied and that the hereto annexed claims be given a scope fully commensurate with the broadest interpretation to which the employed language admits.

What I claim, is:

1. In a roasting stick: a rod of extended length having a handle fixed upon one end and upon the other end providing an integral fork the prongs of which are sharpened and extend beyond the rod parallel to one another and co-planar with the rod, and a hand-grip separate from the handle journaled upon the rod for sliding movement thereon between the handle and the fork, said hand-grip having a longitudinal slot of substantial length bisecting one end of the hand-grip so that squeeze pressure applied from the hand of the user upon said bisected end of the hand-grip compresses the latter upon the rod to grip said rod and prevent the same from turning relative to the hand grip.

2. In a roasting stick: a rod of extended length having a handle fixed upon one end and upon the other end providing an integral fork the prongs of which are sharpened and extend beyond the rod parallel to one another and co-planar with the rod, and a hand-grip separate from the handle having a center-bore receiving the rod therein for sliding movement of the hand-grip between the handle and the fork, the span across said hand-grip being wider than the fork, said hand-grip being provided in its front end with a bisecting longitudinal slot having a length exceeding that of the fork and a width at least as wide as the diameter of the prongs so that, by advancing the hand-grip to the forward extreme of its sliding movement, the points of the prongs are guarded by sheathing the fork within the slot of the hand-grip.

3. In a roasting stick: a rod of extended length having a handle fixed upon one end and upon the other end providing a sharpened prong, and a hand-grip separate from the handle journaled upon the rod for sliding movement thereon between the handle and the prong, means being provided upon the hand-grip operable at will by the user for releasably gripping the rod to prevent the rod from turning relative to the hand-grip the means for releasably gripping the rod comprises a longitudinal slot bisecting one end of the hand-grip with the length of the slot such that the bisections may be compressed upon the rod by squeeze pressure applied to the bisected end from the hand of the user.

4. In a roasting stick: a rod of extended length having a handle fixed upon one end and upon the other end providing an integral fork the prongs of which are sharpened and extend beyond the rod parallel to one another and co-planar with the rod, and a hand-grip separate from the handle receives for sliding movement between the handle and the fork, said hand-grip being provided in its rear end with a center bore serving as a journal for said slide movement of the hand-grip on the rod and having a recess in its front end exposed to the front and communicating with said bore and having a size permitting the fork to be wholly sheathed within the recess for guarding said sharpened points of the prongs when the stick is not in use, the fork being provided at its root end with a cross-arm joining the prongs to the rod, said cross-arm shouldering against the inner end of the recess to serve a stop function limiting the forward travel of the hand-grip upon the rod when the fork is being sheathed within the hand-grip.

References Cited in the file of this patent

UNITED STATES PATENTS

| | | |
|---|---|---|
| 2,122,340 | Durno | June 28, 1938 |
| 2,191,226 | Clem | Feb. 20, 1940 |
| 2,483,546 | Kaminski | Oct. 4, 1949 |
| 2,600,981 | Fahey | June 17, 1952 |

FOREIGN PATENTS

| | | |
|---|---|---|
| 6,626 | Great Britain | Apr. 21, 1884 |